July 10, 1923.  1,461,448
J. McKECHNIE ET AL
MEANS FOR INDICATING ERROR IN DIRECTION OF ROTATION OF SHAFTS AND OTHER
MECHANICAL ROTARY MEMBERS
Filed Aug. 22, 1921  2 Sheets-Sheet 1
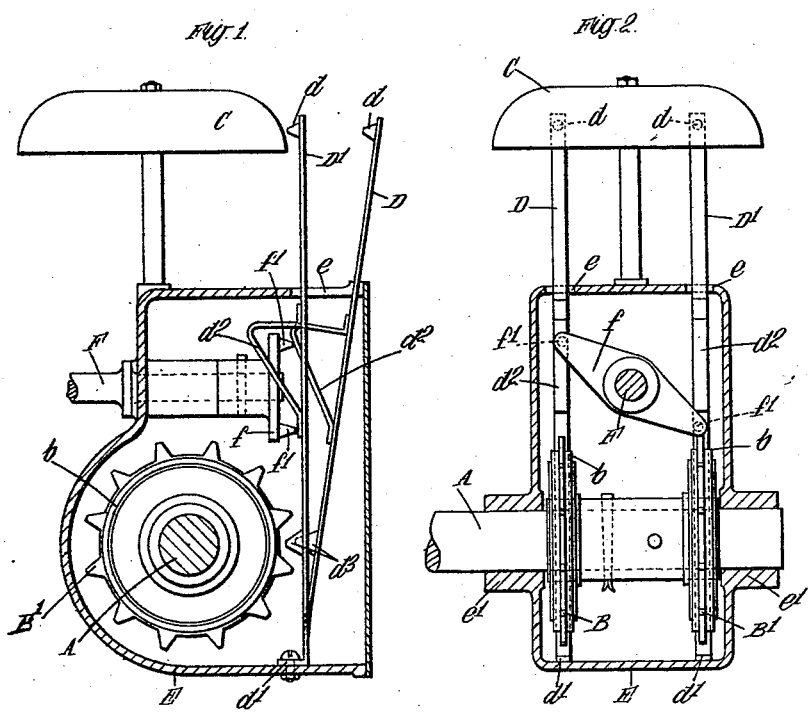

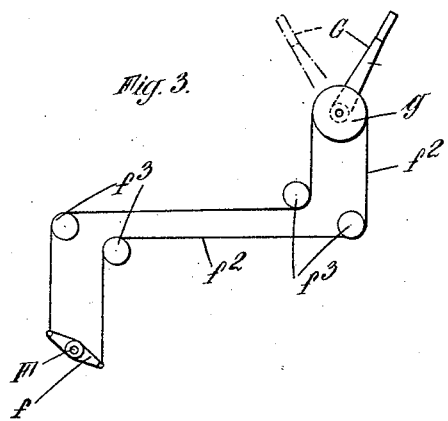

Patented July 10, 1923.

1,461,448

UNITED STATES PATENT OFFICE.

JAMES McKECHNIE AND WILLIAM FLOYD RABBIDGE, OF BARROW-IN-FURNESS, ENGLAND, ASSIGNORS TO VICKERS LIMITED, OF LONDON, ENGLAND.

MEANS FOR INDICATING ERROR IN DIRECTION OF ROTATION OF SHAFTS AND OTHER MECHANICAL ROTARY MEMBERS.

Application filed August 22, 1921. Serial No. 494,109.

*To all whom it may concern:*

Be it known that we, JAMES McKECHNIE and WILLIAM FLOYD RABBIDGE, both subjects of the King of Great Britain, residing at Naval Construction Works, Barrow-in-Furness, in the county of Lancaster, England, have invented certain new and useful Improvements in Means for Indicating Error in Direction of Rotation of Shafts and Other Mechanical Rotary Members, of which the following is a specification.

This invention relates to means for indicating error in the direction of rotation of shafts or other mechanical rotary members and more especially error in the direction of running of engines so as to give warning in the event of an engine or machine running in a direction not authorized by the signal from the telegraphic apparatus provided in cases where orders for the engine or machine are transmitted from a distance, as for example, on board ship, or where such error may occur between the engine or machine and any reversing or control mechanism.

According to this invention the telegraphic or control apparatus is provided with means by which it may control alternatively either one of a pair of signalling or warning devices which are also actuated by the rotating member so that if the rotating member is turning in a direction contrary to that corresponding to the telegraphic or control indication the corresponding signalling or warning device is operated and attention called to the error in direction. The mechanism may also be arranged to give warning if rotation continues after "stop" has been signalled.

A convenient apparatus for this purpose comprises a bell operated by either one of a pair of spring hammers or clappers each provided with a tooth or stud adapted to be struck by a toothed wheel or equivalent striking member on the shaft or other rotating member, the two toothed wheels or striking members being mounted upon oppositely directed free wheel clutches so that only one clapper or equivalent signalling or warning device is operated at a time. Either one of the clappers or equivalent devices is held up by a lever or equivalent device on the telegraphic or control gear when the gear indicates motion in either direction, which lever may, for example, act against a cam piece on the clapper arm or spring so as to hold up the corresponding clapper from operation by the rotating striker.

In order that the said invention may be clearly understood and readily carried into effect the same will now be described more fully with reference to the accompanying drawings in which:—

Figure 1 is a side and Figure 2 a front elevation, with outer casing in section, of the device embodying this invention.

Fig. 3 shows diagrammatically the connections to a distant ship's telegraph or control apparatus.

A is the rotating member shown in the form of a shaft. B, B' are toothed wheels mounted on the shaft through free wheel clutches at $b$ arranged to clutch in opposite directions. C is the warning bell. D, D' are a pair of clappers in the form of long springs provided with hammer studs $d$ which strike upon the bell C. E is the casing within which the spring clappers are mounted, their lower ends $d'$ being screwed upon the base of the casing, while the clappers extend through the openings $e$ in the upper side of the casing. $e'$, $e'$ are bearings where the shaft A passes through the casing. F is the terminal shaft of the telegraphic control gear, on which shaft is mounted the lever $f$ provided with studs $f'$ adapted to meet the cam pieces or wedges $d^2$ on the spring clappers D, D'.

The shaft F is turned into one position or the other by the lever G of the ship's telegraph through the pulley $g$ and the flexible connection or cord $f^2$ passing over the guiding pulleys $f^3$.

The lever $f$ on the end of the telegraphic or control shaft F is turned in one direction or the other according to the direction in which the engine or other apparatus is to turn, the shaft A being driven from the said engine or other apparatus so that its direction of rotation depends on the control direction of turning of the apparatus. With the lever $f$ in the position shown in the drawings the stud $f'$ at the left hand side of Figure 2 rides up the cam member $d^2$ of the spring clapper D so that, as shown in Figure 1, this clapper is held back clear of the bell C and the tooth or stud $d^3$, which when the clapper is in operative position is struck by the corresponding toothed wheel B, is held clear of the said wheel so that it is unaffected by its rotation. If the shaft A is turning in the direction required the wheel B is clutched therewith, so that the wheel is driven with the shaft.

The second clapper D' is left in operative position and its stud $d^3$ is therefore within the reach of the toothed wheel B'. If, however, the shaft A is turning in the proper direction according to the position of the telegraph lever G the wheel B is free and is therefore merely held by the stud $d^3$ without affecting the clapper. If on the other hand the direction of rotation of the shaft A does not correspond to the correct instructions, the clutch of the wheel B' is in operation and the wheel is therefore turned with the shaft, operating upon the stud $d^3$ of the clapper D' and causing the clapper to give repeated blows on the warning bell or equivalent device C.

On reversing the required direction of movement, the shaft F of the telegraphic or control gear is turned to bring the lever $f$ into the position which releases the clapper D and shifts the clapper D' out of operative position.

If the shaft F and lever $f$ are in the middle position it may be arranged that the studs $f'$ just clear the cam pieces $d^2$, this corresponding to the stop position, so that neither clapper is held up by the lever and rotation in either direction of the shaft A causes a warning to be given.

The signal or warning apparatus, while shown of bell and clapper type, may be of any suitable character to give either an audible or visible warning and the rotating toothed wheels may be replaced by any equivalent device adapted to effect the operation of the warning apparatus in either direction of rotation of the shaft.

What we claim and desire to secure by Letters Patent of the United States is:—

1. In indicating mechanism for rotary members, a pair of indicating devices, a pair of oppositely acting clutch members on the rotary member, adapted to operate either one of the indicating devices alternatively according to the direction of rotation and a distant control device adapted to place either one of the indicating devices out of operation by the corresponding clutch member.

2. In indicating mechanism for rotary members, a sound warning bell, a pair of clappers, a pair of free wheel clutch mounted rotary striking devices on the rotary member, the clutches of which work in opposite directions, each of the said striking members being adapted to operate one of the said clappers, and a distant control member adapted to move back either one of the clappers alternatively out of operative contact with its striking member.

3. In indicating devices for rotary members, a warning bell, a pair of spring clappers adapted to strike the said bell, each clapper having an operating stud, a pair of toothed wheels on the rotary member adapted to operate the clappers through the striking studs, oppositely directed free wheel clutches on which the said toothed wheels are mounted, a distant control member adapted to turn into either one of two positions according to the direction in which the rotary member is to turn, and means provided on the distant control member whereby one or other of the clappers is pressed back out of operative position according to the direction of rotation required for the rotary member.

JAMES McKECHNIE.
WILLIAM FLOYD RABBIDGE.